United States Patent [19]

Gillbrand

[11] Patent Number: 5,281,188
[45] Date of Patent: Jan. 25, 1994

[54] BELT TRANSMISSION IN AN INTERNAL COMBUSTION ENGINE FOR ACCESSORY DEVICE DRIVING

[75] Inventor: Per Gillbrand, Mariefred, Sweden

[73] Assignee: SAAB Automobile Aktiebolag, Sweden

[21] Appl. No.: 934,695

[22] PCT Filed: Mar. 27, 1991

[86] PCT No.: PCT/SE91/00233

§ 371 Date: Sep. 23, 1992

§ 102(e) Date: Sep. 23, 1992

[87] PCT Pub. No.: WO91/14594

PCT Pub. Date: Oct. 3, 1991

[30] Foreign Application Priority Data

Mar. 28, 1990 [SE] Sweden ............................ 9001118

[51] Int. Cl.$^5$ .............................................. F16H 7/00
[52] U.S. Cl. ...................................... 474/101; 474/134
[58] Field of Search ............... 474/101, 109, 111, 113, 474/114, 115, 133–134, 136, 137

[56] References Cited

U.S. PATENT DOCUMENTS 1,220,304  3/1917  Welffens ........................ 474/134 X
1,320,044  10/1919  Heaney ........................... 474/134 X
1,869,692  8/1932  Horner ............................ 474/134 X
2,456,518  12/1948  Iofton .
4,558,668  12/1985  Yabunaka .

FOREIGN PATENT DOCUMENTS 325667  9/1920  Fed. Rep. of Germany .
525070  8/1940  United Kingdom .
855309  11/1960  United Kingdom .

*Primary Examiner*—Thuy M. Bui
*Attorney, Agent, or Firm*—Ostrolenk, Faber, Gerb & Soffen

[57] ABSTRACT

In an internal combustion engine, there is arranged a belt transmission for driving an accessory device. In this connection, deflection members are arranged so that the drive belt for its driving bears against, for example, the flywheel of the engine. The deflection members are arranged so that the area enclosed by the drive belt lies outside the area which encloses the axis of rotation of the flywheel. By virtue of the fact that consequently the drive belt can be mounted without the drive belt needing to cross the axis of rotation, the belt transmission can simply be arranged at the rear side of the engine. This means that the axial extent of the engine can be reduced.

16 Claims, 1 Drawing Sheet

BELT TRANSMISSION IN AN INTERNAL COMBUSTION ENGINE FOR ACCESSORY DEVICE DRIVING

The present invention relates to a belt transmission in an internal combustion engine for driving at least one accessory device and more particularly to the arrangement and support of the belt, for easing its installation and removal while maintaining its effective drive capability.

STATE OF THE ART

In internal combustion engines, use is made of a number of different accessory devices for the engine, which devices are driven by the engine. In internal combustion engines for use in vehicles, these accessory devices can consist, for example, of a generator, an AC compressor, a cooling water pump and a steering servo pump. Driving of such accessory devices is usually brought about with the aid of a belt transmission at one end, usually a front end, of the engine, a belt pulley, which is connected firmly to the crankshaft of the engine, driving via one or more drive belts a belt pulley on each accessory device. At the same end of the engine, there can also be arranged drive transmissions for camshafts, a lubricating oil pump, any balancer shafts, any supercharging compressor and like of the engine. These transmissions, in the event that these accessory devices need to be synchronised with the crankshaft of the engine, are usually designed as gearbelt transmissions, chain transmissions or gearwheel transmissions.

As a result of a number of different accessory aggregates thus being driven by the crankshaft of the engine at one end of the engine, the problem of finding room for all these units arises. This problem is especially obvious in engines for use in passenger cars and where the engine is arranged in the transverse direction of the vehicle. In this connection, the width of the vehicle limits the possibilities of allowing the dimensions of the engine to extend too far.

A further problem is that in the event that all accessory devices are driven by a single drive belt and this breaks, all drive to the remaining accessory devices also stops. Making use of a single drive belt also means that said drive belt is subjected to high stresses since it must in total transmit relatively great forces. Increased forces in the drive belt mean that correspondingly high forces come to act on the bearings and attachments of the accessory aggregates.

As a solution to the abovementioned problem, it is already known to arrange transmissions for driving accessory devices also at the other end, usually a rear end, of the engine.

According to a solution which is described in greater detail in patent specification U.S. Pat. No. 4,558,668, use is made of a gear ring fixed to the flywheel of the engine for driving a drive belt, which drive belt drives a belt pulley connected to a power take-off shaft. The same gear ring is used on starting for interaction with a starter motor pinion. In order that in this connection the starter motor pinion should not act on the drive belt, the starter motor is arranged along a part of the gear ring which is not covered by the drive belt. A disadvantage of this design is that the gear ring is arranged to be engaged around by the drive belt. In the event of any drive belt exchange, the possibility must be created of mounting the drive belt. In a vehicle engine, in which clutch and gearbox are directly connected to the flywheel, this means that, for example, the entire clutch must be demounted if a non-divisible drive belt is used. An alternative is to use a drive belt which can be opened, or separated along its length but this then means instead that a more complicated drive belt must be used.

The abovementioned disadvantages have meant that, at least in internal combustion engines for use in passenger cars and at least to any extent worth mentioning, no solution has come into practical use, which uses the flywheel of the engine for driving accessory aggregates.

AIM OF THE INVENTION

The aim of the present invention is to make possible a solution for driving accessory devices on the flywheel of the engine, but which does not display the disadvantages which characterise known solutions. In this way, exchange and mounting of a new drive belt shall be able to be carried out without large parts of the transmission needing to be demounted or the drive belt needing to be of openable design.

BRIEF DESCRIPTION OF THE INVENTION

The belt transmission of the invention comprises a closed continuous driving belt which is driven by a driving belt pulley of an engine, particularly a vehicle engine and particularly an internal combustion engine. The driving belt transmits driving force from the engine to the driving belt pulley, and then to drive means of an accessory device. The drive means for the accessory device is inside the loop of the driving belt.

At least two spaced apart deflection members support and deflect the driving belt to partially wrap around the driving belt pulley so that the outside of the driving belt bears against the driving belt pulley and particularly around the periphery thereof. The inside of the driving belt bears against the drive means, which is in the form of a belt pulley, of the accessory device. The driving belt is deflected so that there is an area that is enclosed by the loop of the drive belt and that area lies outside the area which includes the axis of rotation of the driving belt pulley.

According to the inventive idea, as a result of arranging the belt transmission with deflection members, it is made possible that the drive belt can be arranged in a loop around the driving flywheel or belt pulley, without the drive belt needing to cross the axis of rotation of the latter on mounting. In that previous problems on exchanging a drive belt are consequently solved, accessory devices can also be arranged at the rear end of the engine without difficulty. On the contrary, it is made possible that the number of accessory devices at the front end of the engine can be reduced with the consequence that the total axial extent of the engine and the accessory devices can be reduced.

Advantageous embodiments of the invention include the following features. The engine on which the belt transmission is provided has one side at which there is a drive transmission. The driving belt pulley is also located on the same one side of the engine, which provides for economy of space usage.

The engine includes a flywheel that is driven by the engine, and the driving belt pulley is at least part of the engine flywheel. Preferably, the outside of the drive belt engages the peripheral surface of the driving belt pulley, which is a smooth surface.

In the preferred design, the at least two deflection members are respectively so placed around the driving belt pulley as to wrap the drive belt partially around the driving belt pulley over an angle of between 120° and 180° and preferably 180°. The two deflection members are disposed inside the loop of the belt and bear against the inside of the belt, along with the drive pulley of the accessory device.

The drive transmission comprises a vehicle gearbox. A clutch between the driving belt pulley and the gearbox is operable to engage the driving belt pulley with the gearbox. Further features and advantages which characterise the invention emerge from the attached descriptive example of an advantageous embodiment.

BRIEF DESCRIPTION OF THE FIGURES

The descriptive example is given with reference to the attached drawings, in which.

DESCRIPTIVE EXAMPLE

Figure 1:
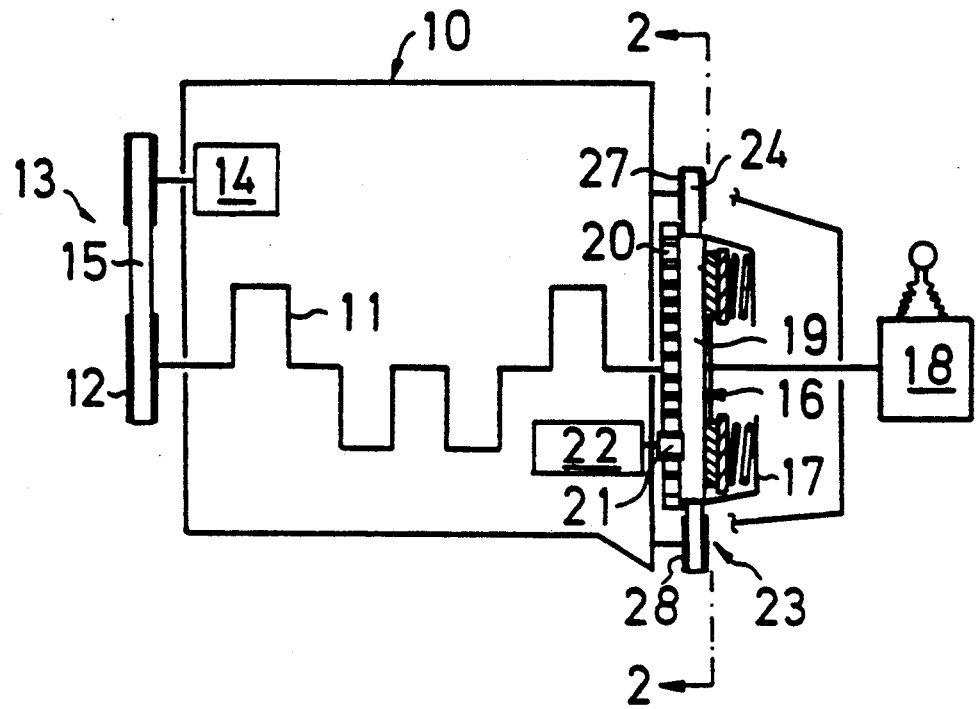
FIG. 1 shows diagrammatically an internal combustion engine connected to the drive transmission of a vehicle.

FIG. 1 shows diagrammatically a multi-cylinder internal combustion engine 10, for example an Otto engine or a diesel engine, for a passenger car or other vehicle. The engine 10 comprises a crankshaft 11, at one end of which, in this case a front end, there is fixed a belt pulley 12 forming part of a belt transmission 13 for driving an accessory device 14 for the engine 10 and/or the vehicle. In the figure, only one accessory aggregate 14 driven by one drive belt 15 is shown, but a number of such accessory devices can advantageously be arranged in conventional manner. All accessory devices can be driven by the same belt 15 or, alternatively, the belt pulley 12 of the crankshaft 11 can be designed with a number of different grooves, in which different separate drive belts fit for separate driving of the accessory devices.

The accessory device can, for example, consist of a coolant pump for the engine 10, a steering servo pump for the vehicle, a coolant compressor for the air conditioning system of the vehicle, a generator for producing electrical energy in the vehicle or a supercharging compressor for the engine 10.

The engine 10 is connected at its other, rear side to a drive transmission for driving the vehicle. In this connection, the crankshaft 11 is connected at its rear end to a flywheel 16, to which there is fixed a friction clutch 17 which interacts with the flywheel 16. From the clutch 17, torque given off from the engine 10 is transmitted further to the driving wheels of the vehicle via a gearbox 18. Both the clutch 17 and the gearbox 18 which form part of the drive transmission consist of the usual type for vehicles and are therefore reproduced in simplified form in FIG. 1. On its outer periphery, the flywheel 16 is designed on the one hand with a cylindrical part 19 with a smooth surface along its periphery and on the other hand with a gear ring 20 intended on starting to interact with a pinion 21 on a starter motor 22. FIG. 1 shows the pinion 21 in engagement with the gear ring 20, as is the case during starting. After starting, the pinion 21 is brought out of this engagement in a manner which is conventional per se.

Figure 2:
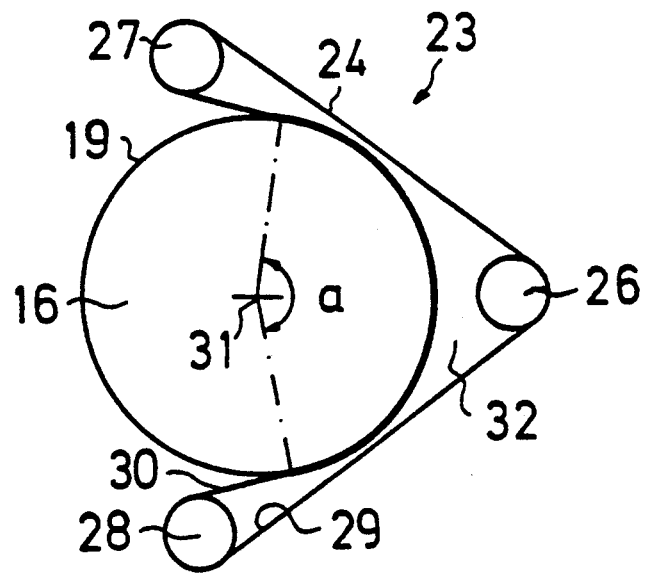
FIG. 2 shows diagrammatically an accessory device transmission on the flywheel of the engine.

Attached FIG. 2 shows in greater detail but still only diagrammatically, in a view according to the cross-section 2—2 according to FIG. 1, the belt transmission 23 on the flywheel 16. In this connection, only the smooth part 19 of the flywheel 16 is shown. The accessory device 26 is shown in the form of a belt pulley for the driving of the flywheel. Additionally, there are included two freely rotatable belt pulleys 27, 28 forming part of deflection members which are used to deflect the drive belt 24 forming part of the transmission 23. All belt pulleys 26, 27, 28 rotate around axes of rotation which are parallel to one another and which are also parallel to the axis of rotation 31 of the flywheel 16. Expediently, the drive belt 24 consists of a continuous, non-openable flat belt with a smooth inner surface 29 and a smooth outer surface 30. The drive belt 24 bears with its inner surface 29 against the three belt pulleys 26, 27, 28, while its outer surface 30 bears against the smooth part of the flywheel 16, which in this connection consists of a belt pulley integrated with the flywheel 16. Both the deflection members 27, 28 have the task of ensuring contact of the belt 24 against the flywheel 16. The belt 24 should bear against the flywheel 16 along a sector angle a of between 120 and 180 degrees. The greater the contact angle a, the more reliable the driving and an angle a of around 180 is thus most advantageous. The angle a indicated of 120 degrees thus corresponds to a suitable lower limit.

Both the deflection members 27, 28 are fixed directly to the engine 10 or indirectly via a bracket or the like. The accessory device 26 also is fixed in similar manner. On the accessory device 26 or on one of the deflection members 27, 28, there should be arranged a tensioning arrangement which makes it possible to adjust the tension of the drive belt 24. The tensioning arrangement is expediently designed as a tensioning arrangement which is conventional for belt transmissions.

The belt transmission 23 according to the invention at the rear end of the engine 10 means that a space not previously used can be used for driving accessory devices. This means that the previous problem of finding room for a number of accessory devices at the front end of the engine 10 can be avoided or at least reduced.

By virtue of the fact that the drive belt 24 is arranged in a deflected manner so that the axis of rotation 31 of the flywheel 16 lies outside the area 32 which is enclosed by the drive belt 24, exchange of the drive belt 24 in a simple manner is made possible. This is dependent on the fact that the drive belt 24 doies not need to cross the axis of rotation 31 of the flywheel 16 on mounting. Normally, the crankshaft 11 of the engine 10, the clutch 17 and the gearbox 18 form units which are interconnected in a manner which does not allow a drive belt to be simply guided over the same.

Which of the accessory devices given as examples in the introduction are to be arranged on the front side or rear side respectively of the engine 10 can in principle be chosen freely according to requirement. Advantageously, however, an accessory device which needs to be driven with a relatively high speed of rotation can be placed at the rear side of the engine 10. The flywheel 16 usually has a diameter which is considerably greater than the belt pulley 12 which is fixed at the front end of the crankshaft 11, which means that a great ratio can be obtained between the flywheel 16 and the accessory device 26.

The invention can be modified and designed other than exemplified in the description. For example, instead of a flat drive belt 24, a V-belt with a smooth outside and a conical inside can be used. In this connection, the belt pulleys 26, 27, 28 can be designed with usual V-shaped grooves, while the smooth outside of the belt bears against the smooth surface 19 of the flywheel 16. When it is necessary to further connect one or two accessory devices at the rear side of the engine, one or both of the deflection arrangements 27, 28 can advantageously be replaced by this accessory device or these accessory devices.

In the example, a conventional flywheel 16 is described, which is adapted to be integrated into a belt transmission. This is advantageous since it means that the same flywheel 16 can be used irrespective of whether or not a belt transmission 23 is arranged at the rear end of the engine 10. However, the flywheel 16 can also be adapted and designed in other ways for the belt transmission, for example, by designing it with grooves or the like. It is also possible to use a separate belt pulley which is firmly mounted directly onto and forms a unit with the flywheel.

In certain vehicle transmissions, for example those in which automatic hydraulic gearboxes are included, conventional flywheels are not used. In such transmissions, the invention can still be used if the drive transmission is provided with a member corresponding to the flywheel. Such a member can in this connection be adapted completely to the belt transmission.

In the description, the front side and the rear side of the engine are indicated in relation to the engine and the clutch and gearbox following. In vehicles with a transverse-mounted drive aggregate, this means that the engine directions front and rear will be oriented in the transverse direction of the vehicle. The invention described is especially advantageous when applied in such transverse-mounted drive aggregates, since it means that the extent of the engine can be made short.

I claim:

1. A belt transmission for driving an accessory device from a drive engine for a vehicle, wherein the engine has a first side and the engine includes a drive transmission for a vehicle at the first side of the engine;

the engine includes means for driving a driving belt pulley, and a driving belt pulley drivingly connected with the belt pulley driving means for driving the belt pulley to rotate; the driving belt pulley being also located at the first side of the engine;

the belt transmission comprises an endless loop, deflectable drive belt, the belt having an outside which is outside the loop of the belt and an inside which is inside the loop;

an accessory device;

a rotatable driving means for the accessory device and located inside the belt loop and spaced away from the driving belt pulley;

two deflection members supporting the belt at locations spaced apart around the driving belt pulley, wherein the path of the belt is determined by the accessory device driving means and the two deflection members, and wherein the accessory device driving means and the deflection members are so placed with respect to the driving belt pulley and the belt is so placed that the outside of the belt bears against and wraps partially around the driving belt pulley; the two deflection members and the accessory device driving means being so placed that an area is defined which is enclosed by the endless loop of the drive belt, and that area enclosed by the drive belt lies outside the area which includes the axis of rotation of the driving belt pulley.

2. The belt transmission of claim 1, wherein the engine is an internal combustion engine.

3. The belt transmission of claim 1, wherein the drive transmission comprises a vehicle gearbox connectable with the vehicle for driving the vehicle and a clutch between the driving belt pulley and the gearbox, the clutch being operable to engage the driving belt pulley with the gearbox.

4. The belt transmission of claim 3, wherein the driving belt pulley includes a flywheel connected with the engine for being rotated by the engine.

5. The belt transmission of claim 1, wherein the engine includes a flywheel driven by the engine and the driving belt pulley is at least part of the engine flywheel.

6. The belt transmission of claim 5, wherein the driving belt pulley has a smooth peripheral surface and the outside of the drive belt bears against the peripheral surface of the driving belt pulley.

7. The belt transmission of claim 1, wherein each of the two deflection members is disposed to be inside the loop of the belt and to bear against the inside of the belt.

8. The belt transmission of claim 7, wherein each of the two deflection members comprises a rotatable belt pulley which rotates in engagement with the inside of the belt.

9. The belt transmission of claim 8, wherein the accessory device driving means comprises a rotatable pulley in engagement with the inside of the drive belt.

10. The belt transmission of claim 1, wherein the belt comprises a continuous, unopened belt.

11. The device of claim 10, wherein the belt is a generally flat belt.

12. The belt transmission of claim 1, wherein the driving belt pulley has a smooth peripheral surface and the outside of the drive belt bears against the peripheral surface of the driving belt pulley.

13. The belt transmission of claim 1, wherein at least one of the deflection members also comprises an accessory device to be driven to operate by the moving drive belt.

14. The belt transmission of claim 1, wherein the two deflection members are respectively so placed around the driving belt pulley as to wrap the drive belt partially around the driving belt pulley over an angle of between 120° and 180°.

15. The belt transmission of claim 1, wherein the two deflection members are respectively so placed around the driving belt pulley as to wrap the drive belt partially around the driving belt pulley over an arcuate angle of approximately 180°.

16. The belt transmission of claim 1, wherein the accessory device driving means comprises a rotatable pulley in engagement with the inside of the drive belt.

* * * * *